United States Patent [19]

Deutsch et al.

[11] Patent Number: 4,932,361

[45] Date of Patent: Jun. 12, 1990

[54] ANIMAL FEEDING SYSTEM

[75] Inventors: Harold L. Deutsch, 6857 Granada Blvd., Coral Gables, Fla. 33146; George Lowe, Bergenfield, N.J.

[73] Assignee: Harold L. Deutsch, Coral Gables, Fla.

[21] Appl. No.: 209,420

[22] Filed: Jun. 20, 1988

[51] Int. Cl.$^5$ .............................................. A01K 5/02
[52] U.S. Cl. .................................. 119/51.12; 119/51.5
[58] Field of Search ............... 119/51.11, 51.12, 51.13, 119/51.5, 56 R; 221/15, 176, 195, 218

[56] References Cited

U.S. PATENT DOCUMENTS

| | | | |
|---|---|---|---|
| 1,966,017 | 7/1934 | McEvoy | 119/51.12 |
| 2,585,371 | 2/1952 | Coffing | 119/51.13 X |
| 3,780,702 | 12/1973 | Waterbury | 119/51.12 X |
| 4,350,120 | 9/1982 | Bittle | 119/51.13 |
| 4,450,790 | 5/1984 | Stansbury, Jr. | 119/51.12 |
| 4,617,874 | 10/1986 | Zammarano | 119/51.12 |
| 4,644,903 | 2/1987 | Shaver | 119/51 R |
| 4,733,634 | 3/1988 | Hooser | 119/51.12 |

*Primary Examiner*—Robert P. Swiatek
*Attorney, Agent, or Firm*—Frishauf, Holtz, Goodman & Woodward

[57] ABSTRACT

An animal feeding system particularly suitable for dispensing prepared food servings to a domesticated animal such as a dog, includes an enclosure in which a number of food servings can be stored for later feeding to the animal. At selected feeding times, each of the servings is aligned with a food transfer location within the enclosure and retrieved by a dispensing mechanism that carries the serving over to a feed opening in the enclosure. The feed opening is sized and located so that the animal can reach through the opening and consume the presented food serving at the selected feeding time.

23 Claims, 5 Drawing Sheets

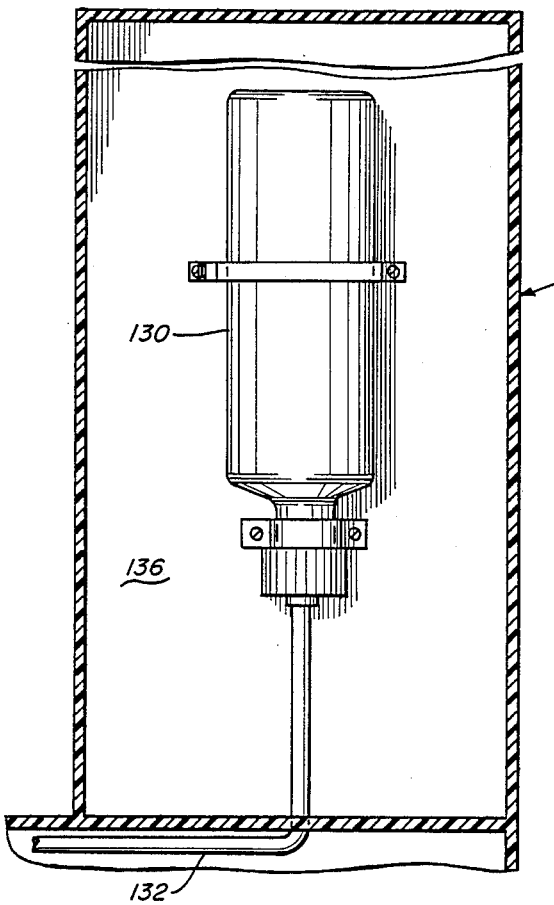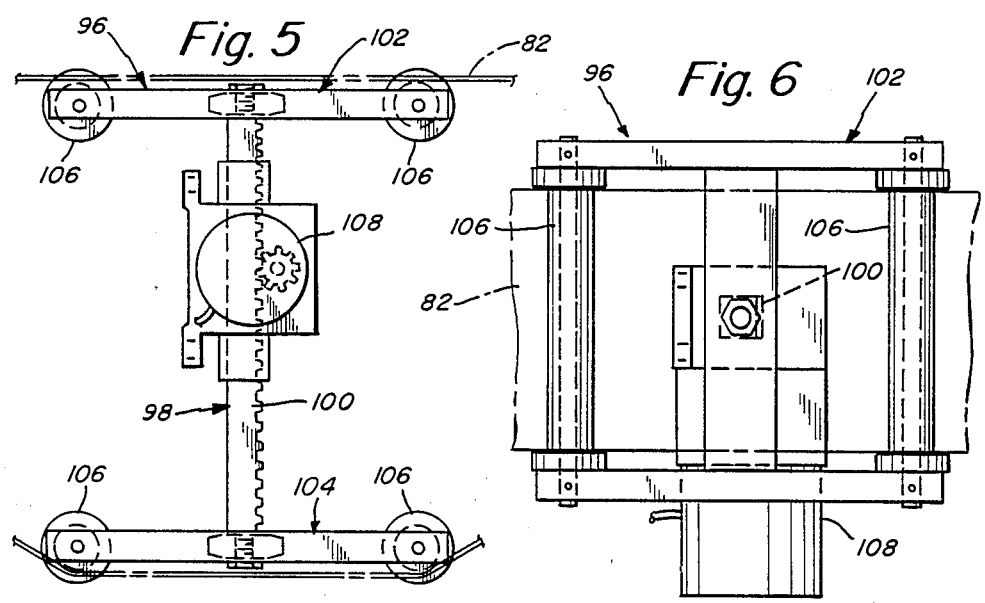

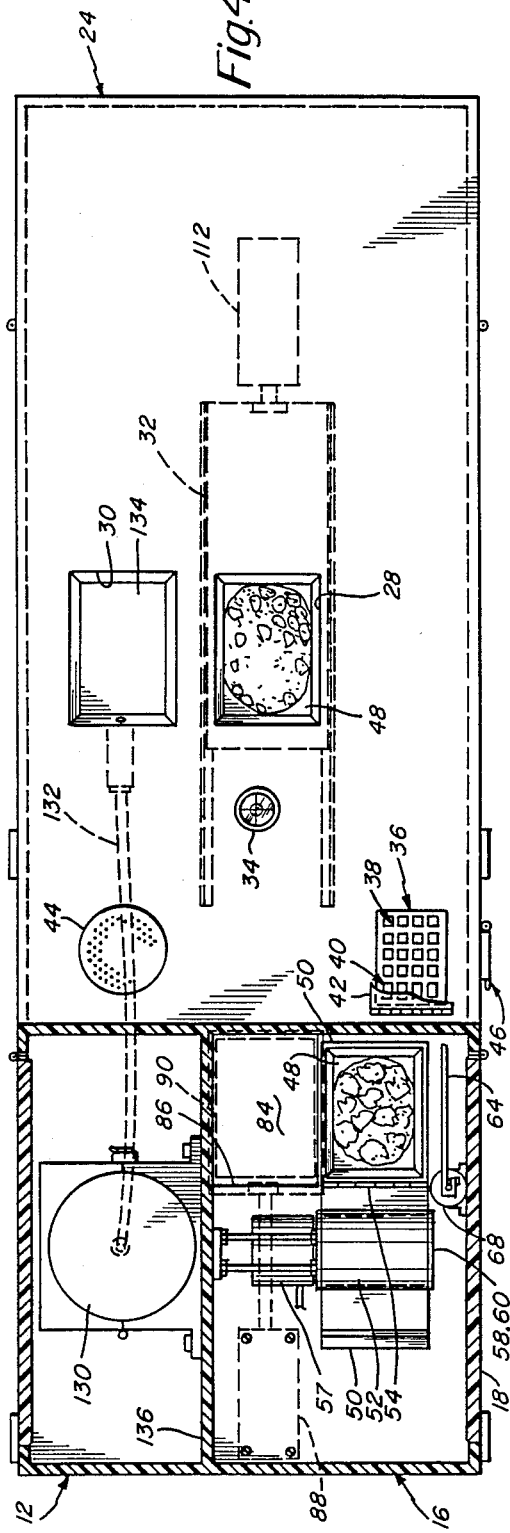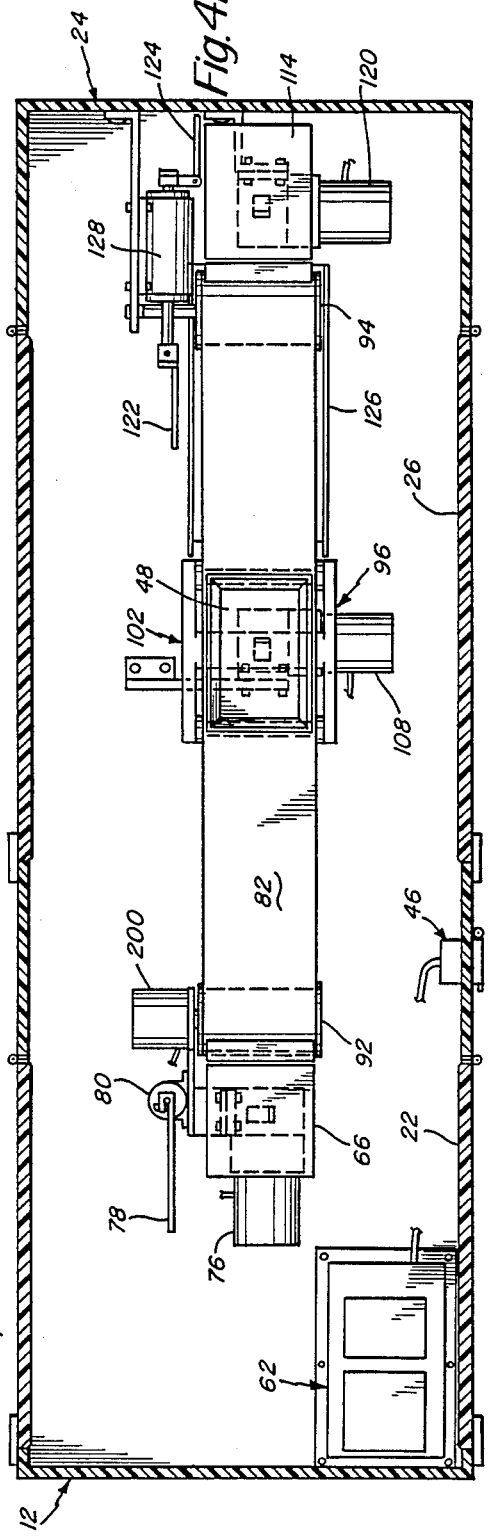

ANIMAL FEEDING SYSTEM

BACKGROUND OF THE INVENTION

1. Field of the Invention

The present invention relates generally to animal feeding systems, and more particularly to an arrangement by which a domesticated animal can be fed individual food servings prepared in advance, at preselected times over a number of days.

2. Description of the Known Art

Apparatus capable of dispensing animal feedings at predetermined intervals is generally known. For example, U.S. Pats, No. 4,617,874 (Oct. 21, 1986) and 4,450,790 (May 29, 1984) show carousel-type food dispensers In which a circular cover with an arcuate cut opening is rotated to register the opening with each of a number of trays of food, at selected times. It is possible, however, that the cover will become jammed by, for example, food lodging between the cover and a base that holds the trays and on which the cover turns. In such case, the animal will be deprived of all later scheduled feedings. Also, a cover jam can result if the animal places an object (toy or bone) in an open food tray and the object protrudes above the cover opening when the cover next rotates.

SUMMARY OF THE INVENTION

An object of the invention is to overcome the above and other shortcomings in the known animal feeding apparatus.

Another object of the invention is to provide an animal feeding system capable of dispensing prepared food servings to a domesticated animal such as a dog when left alone one or more days.

A further object of the invention is to provide an animal feeding system in the form of a portable unit, for storing a number of prepared food servings in the order in which they are to be dispensed to the animal over a period of time.

A further object of the invention is to provide an animal feeding unit capable of stand alone operation, or of acting as a master unit when connected with identical slave units to dispense food servings to a number of animals maintained in separate quarters.

Still another object of the invention is to provide an animal feeding unit capable of storing individually prepared servings over an extended period of time without spoilage.

Another object of the invention is to provide an animal feeding apparatus capable of playing a pre-recorded tape of an owner's voice at predetermined times for the comfort of the animal.

Yet another object of the invention is to provide an animal feeding apparatus capable of reproducing an owner's voice transmitted by way of a telephone line to the animal.

Another obJect of the invention is to provide self-contained animal feeding apparatus in which bowls that have been emptied of food servings by an animal, are stored in a compartment until removal by the owner.

According to the invention, animal feeding apparatus includes a cabinet with a feed opening sized to allow an animal to reach through the opening and eat food positioned in the cabinet next to the opening. Storage means in the cabinet stores a number of prepared food servings, and dispensing means operatively associated with the storage means retrieves the food servings from a transfer location and conveys them to a position next to the feed opening in the cabinet at selected feeding times. Control means enables each of the stored food servings to be retrieved and conveyed proximate to the feed opening at certain times entered by input means such as a keypad.

A method of feeding an animal, according to the invention, includes preparing a number of food servings for feeding to an animal at different times, storing the food servings in an enclosure thereby keeping them inaccessible to the animal, selecting feeding times at which the servings are to be fed to the animal, and dispensing each of the servings at the selected feeding times by conveying each serving from a transfer location to the vicinity of a feed opening in the enclosure, whereby the animal can reach through the feed opening to eat the food servings at the selected feeding times.

The various features of novelty which characterize the invention are pointed out with particularity in the claims annexed to and forming a part of the present disclosure. For a better understanding of the invention, its operating advantages and specific objects attained by its use, reference should be had to the accompanying drawing and descriptive matter in which there is illustrated and described a preferred embodiment of the invention.

BRIEF DESCRIPTION OF THE DRAWING

FIG. 3 is a sectional view through a part of the apparatus in FIG. 1, as taken along line 3—3;

FIG. 4A is a top view, partly in section, of the apparatus in FIG. 1 and as seen along line 4A—4A;

FIG. 4B is a sectional view of the apparatus in FIG. 1 as seen along line 4B—4B;

FIG. 5 is an enlarged view of conveyor belt deflecting means shown in FIG. 2;

FIG. 6 is a top view of the conveyor belt deflecting means shown in FIG. 5; and

DETAILED DESCRIPTION OF THE INVENTION

Figure 1:
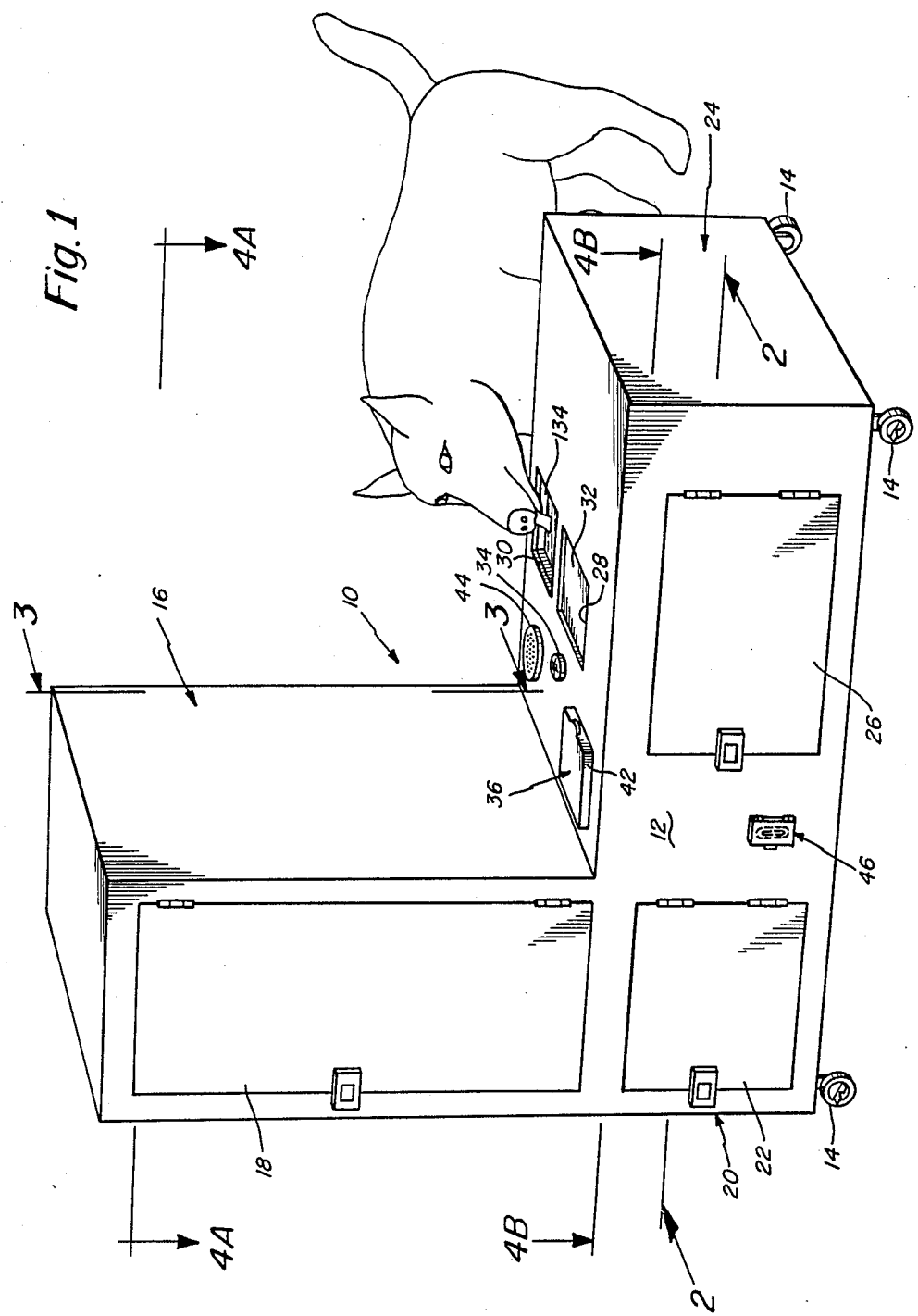
FIG. 1 is a perspective view of an animal feeding apparatus according to the invention.

FIG. 1 is a perspective view of animal feeding apparatus 10 according to the invention.

A cabinet 12 made of, for example, fiberglass with suitable interior reinforcing members (not shown) houses the various operating components of the apparatus 10, and has sets of casters 14 to facilitate easy movement of the apparatus 10 from one place to another. Casters 14 preferably are capable of being locked in position.

As shown in FIG. 1, the present feeding apparatus 10 basically is comprised of three sections. A storage section 16 of the cabinet 12 has a first lockable access panel 18, and contains individual food servings for feeding to an animal at selected times over one or more days. A warming section 20 with a second, hinged access panel 22 contains food heating elements and a dispensing mechanism which retrieves food servings contained in the storage section 16, for feeding at the selected times to the animal. Much of the electrical control circuitry for the apparatus 10 may also be located behind the second access panel 22 in a protective compartment (see FIG. 2).

A food delivery section 24 with a third, hinged access panel 26 houses a conveyor arrangement (see FIGS. 2 and 4B) by which each of the retrieved stored food servings is conveyed proximate to a feed opening 28 in the cabinet 12. Another opening 30 in the cabinet 12 allows access to a supply of water for the animal at all times. A sliding panel 32, shown in a closed position in FIG. 1, serves to block entry through the feed opening 28 at times other than the selected feeding times.

Typical dimensions for the cabinet 12 are, for example, 36 inches (91.44 cm) long, 30 inches (76.2 cm) high at the storage section 16, and 12 inches (30.48 cm) high at the food delivery section 24. Of course, the food delivery section having the feed opening 28 at its top should not be higher than would allow the animal to reach into the feed opening 28 and/or easily drink from the water bowl opening 30 when desired.

Since it is important that the apparatus 10 be level for proper operation of its internal mechanisms, a bubble level 34 is provided on the cabinet 12, for example, atop the food delivery section 24 as shown in FIG. 1. Conventional level adjustment means (not shown) may be associated with some or all of the casters 14 to facilitate proper leveling of the apparatus 10.

Input means 36 including a conventional key pad 38 and a liquid crystal (LC) display 40 are mounted on the cabinet 12 atop the food delivery section 24, and are protected when not used by a hinged lid 42. A speaker 44 is also mounted on the cabinet 12, next to the input means 36 in the FIG. 1 embodiment, for reproducing a pre-recorded tape or a voice transmitted over outside telephone lines for the comfort of the animal being serviced by the apparatus 10.

A data port 46 may be provided on the side of the cabinet 12 for the purpose of coupling internal control circuitry with that of one or more identical units for use in kennels or the like. In such cases, one "master" unit acts to control a number of "slave" units wherein essential operating parameters for all of the units are entered with the input means 36 of the master unit.

Figure 2:
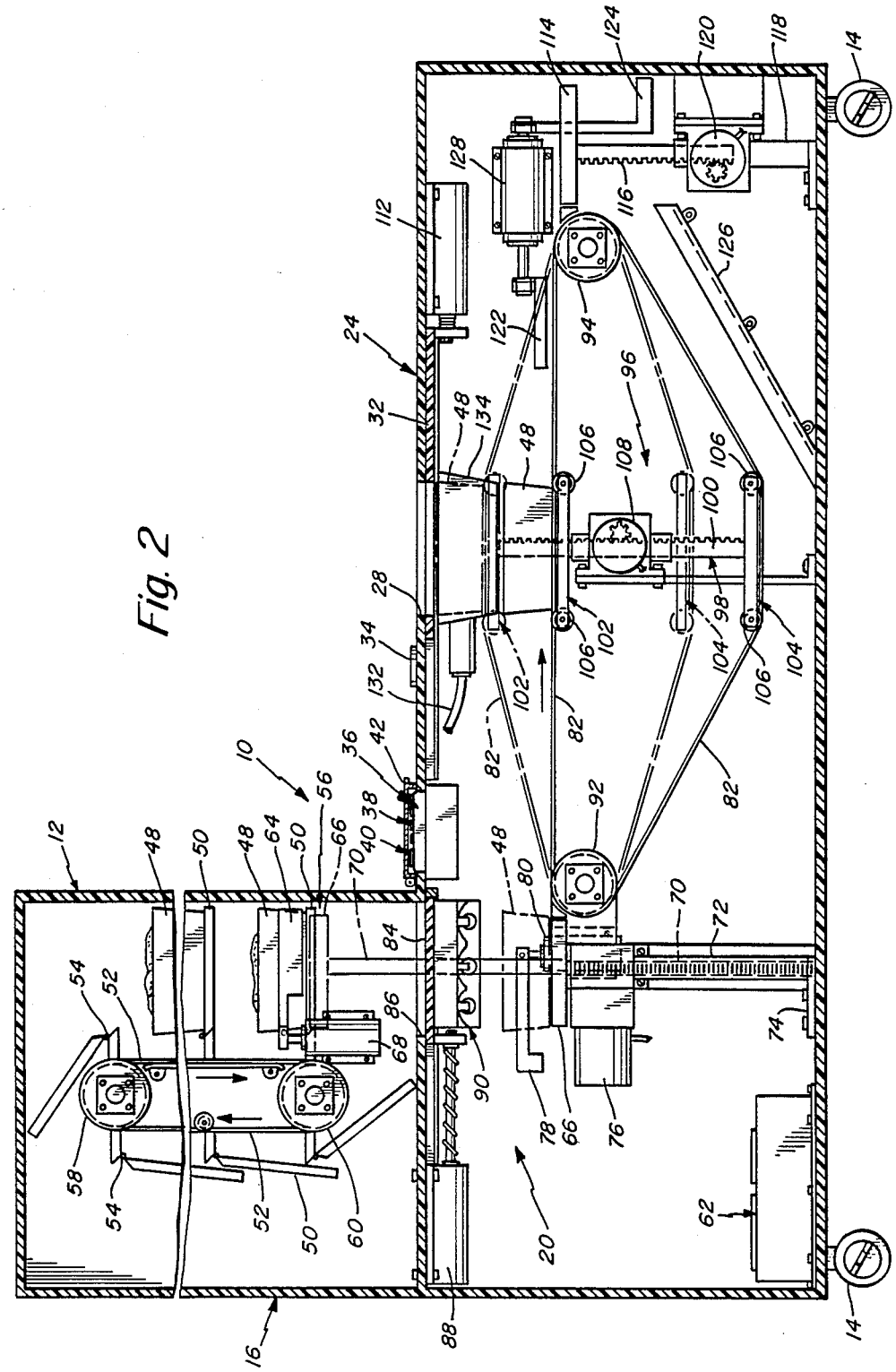
FIG. 2 is a sectional view as taken through line 2—2 in FIG. 1.

FIG. 2 is a cross-sectional view of the present animal feeding apparatus 10, taken along line 2—2 in FIG. 1. Various operating mechanisms of the storage section 16, warming section 20, and food delivery section 24 are shown mounted within the cabinet 12.

In the disclosed embodiment, storage section 16 enables a number of bowls 48 each containing individually prepared food servings to be stored behind, the first access panel 18 (FIG. 1), inaccessible to the animal when left alone with the apparatus 10. Each bowl 48 is supported on a corresponding hinged shelf 50. The hinged shelves 50 are supported in cantilever fashion at the right side of a movable endless belt 52 from which the shelves 50 depend as viewed in FIG. 2. "V"-cut hinge joints 54 between the shelves 50 and the belt 52 allow the shelves 50 to fold downwardly after passing a transfer location 56 at which the bowls 48 are retrieved to be dispensed by the food delivery section 24. As shown in FIG. 2, allowing the individual shelves 50 to fold when moving past the transfer location 56, permits the interior volume of the storage section 16 to be minimized.

The belt 52 together with an upper idler roller 58 and a lower drive roller 60 form a meal storage conveyor which is driven by a conventional stepper motor 57 (shown in FIG. 4). The motor may be one available from, e.g., Oriental Motor Company and is mounted for driving engagement with the lower drive roller 60. The belt 52 runs in the direction shown by the arrows when the motor 57 is energized by a suitable controller and driver contained in an electronic circuits compartment 62. Both of the rollers 58, 60 and the stepper motor are mounted on rigid reinforcing members (not shown) of the cabinet 12.

A swivel arm 64 is arranged at the transfer location 56 for swinging movement about an axis perpendicular to the surface of a shelf 50 at the location 56, for transferring a bowl 48 on the shelf 50 onto a platform 66 when the platform 66 is elevated to the transfer location 56. Swivel arm 64 is actuated at the appropriate time by a solenoid operated push mechanism 68 supported in the cabinet 12 and driven by circuitry within the compartment 62.

The platform 66 is fixed at an end of a shaft 70 supported for axial sliding movement within a sleeve 72 mounted on the floor of the cabinet at 74. The platform shaft 70 has rack teeth engaged with a conventional linear head motor 76, such as one manufactured by Oriental Motor Company.

Another swivel arm 78 is supported for swinging movement about an axis perpendicular to the top surface of the platform 66, when the platform 66 is at a lower position as shown in solid lines in FIG. 2. Swivel arm 78 is driven by another solenoid push mechanism 80 similar to the mechanism 68. When a bowl 48 descends to the lower position on the platform 66, as shown in dashed lines in FIG. 2, the push mechanism 80 actuates the swivel arm 78 to transfer the bowl 48 on the platform onto an upstream end of a food conveyor belt 82.

Depending on environmental conditions, it may be desirable to provide refrigeration means to maintain the food servings in the stored bowls 48 in storage section 16 below a certain temperature. In order to prevent warm air from entering the interior of the storage section 16, a feed-through door 84 is provided for closing an opening 86 at the bottom of the storage section 16. The opening 86 allows the platform 66 to be raised into and lowered from the storage section 16 when retrieving a bowl 48 from the transfer location 56. A solenoid mechanism 88 engages a lip on the door 84 and operates to slide the door open only when a bowl 48 is to be retrieved. The solenoid mechanism 88 is actuated by appropriate circuitry within the compartment 62.

Once a food serving in a bowl 48 is lowered from the storage section 16, it may be desirable to warm the food serving particularly if it has been refrigerated in the storage section 16. Accordingly, one or more heaters 90 supported near the top of the warming section 20 are provided. The heaters 90 are energized a predetermined time with a bowl 48 containing the food serving at the lower position on the platform 66, by suitable control circuitry in the compartment 62.

The food conveyor belt 82 is stretched between a drive roller 92 and an idler roller 94 supported for rotation in the food delivery section 24 of the cabinet 12. A stepper motor (not shown) engages the drive roller 92 and causes the food conveyor belt 82 to advance in the direction shown by the arrow in response to a suitable controller and driver in the electronic circuits compartment 62. The stepper motor may be a conventional unit such as one manufactured by Oriental Motor Company.

The motor and both of the rollers 92, 94 are supported by reinforcing members (not show ) within the cabinet 12.

A deflector assembly 96 for the food conveyor belt 82 is arranged medially of the stretch of the belt 82 between the rollers 92, 94 as shown in FIGS. 2 and 4B. The purpose of the deflector assembly 96 is to raise the upper stretch of the belt 82 toward the feed opening 28 when a bowl 48 containing a food serving is aligned beneath the feed opening 28. When so raised, the bowl 48 can be centered and steadily fixed adjacent to the feed opening 28 by conventional guiding and holding means (not shown) so that an animal can eat from the bowl 48 through the opening 28 without difficulty.

Details of the deflector assembly 96 also appear in FIGS. 5 and 6.

Deflector assembly 96 includes a generally "I" shaped deflecting member 98 mounted for reciprocal movement between the upper and lower stretch of the food conveyor belt 82. A toothed rack 100 joins upper and lower belt support rails 102, 104 perpendicular to the axis of the rack 100. Belt support rollers 106 are mounted for free rotation about pivot axes at the free ends of corresponding rails 102, 104. The rollers 106 frictionally engage the inner surfaces of the food conveyor belt 82 and cause the upper stretch of the belt 82 to deflect as the rack 100 is driven by a conventional linear head motor 108 with which the rack is engaged. The motor 108 is mounted to a rigid reinforcing member (not shown) in the cabinet 12. Motor 108 includes a conventional gear unit through which the toothed rack 100 extends and is driven in the direction of its axis when the motor 108 is energized by a suitable controller and driver in the electronic circuits compartment 62.

As a result of the structure described above, when a bowl 48 is placed at the upstream end of the food conveyor belt 82 and the belt is driven to convey the bowl 48 beneath the feed opening 28, i.e., centered over the upper belt support rail 102, the bowl 48 can be elevated to register against the feed opening 28 as the motor 108 is energized to drive the rack 100 of the deflector assembly 96. A sliding panel 110 arranged to close the feed opening 28 at times other than when an animal is to be fed, is retracted to an open position, shown in FIG. 2, by a solenoid mechanism 112.

After a bowl is raised to a feeding position as shown in dashed lines in FIG. 2, and maintained at the feeding position for a determined time while the food conveyor belt 82 is stationary, the deflector assembly 96 operates to lower the upper stretch of the belt 82 with the bowl 48 and, after assuming the position shown in solid lines in FIG. 2, the belt 82 is driven by its associated stepper motor (not shown) until the bowl 48 arrives at a downstream end of the belt 82 in the vicinity of the roller 94. The bowl 48 is then deflected off the belt 82 onto a platform 114 that can thereafter be lowered on a support shaft 116 arranged for sliding movement in a sleeve 118 mounted on the bottom floor of the cabinet 12. The platform shaft 116 has rack teeth, and is driven by a linear head motor 120 similar to the motors 108 and 76. A swivel arm 122 assists in the unloading of the bowl 48 onto the raised platform 114, and another swivel arm 124 urges a bowl placed on the platform 114 onto a ramp 126. Both swivel arms 122, 124 are actuated by a solenoid mechanism 128 in the cabinet 12. Once placed at the top of the ramp 126, the bowl descends onto the floor of the food delivery section 24 of the cabinet 12, to be retrieved upon opening the third access panel 26 in the cabinet (FIG. 1).

FIG. 3 is a sectional view through the storage section 16 of the apparatus 10, showing a water supply container 130 mounted in a region out of the way of the conveyor-driven shelves 50 in the storage section 16. A water conduit 132 supplies water that is gravity fed from the container 130 to a water bowl 134 fixed beneath the opening 30 as shown in FIG. 4A. A constant supply of water thus is always available for the animal. If the food servings in the storage section 16 are maintained under refrigeration, an insulating partition wall 136 is provided in the cabinet 12 between the water supply container 130 and the shelves 50 and associated mechanisms.

Figure 7:
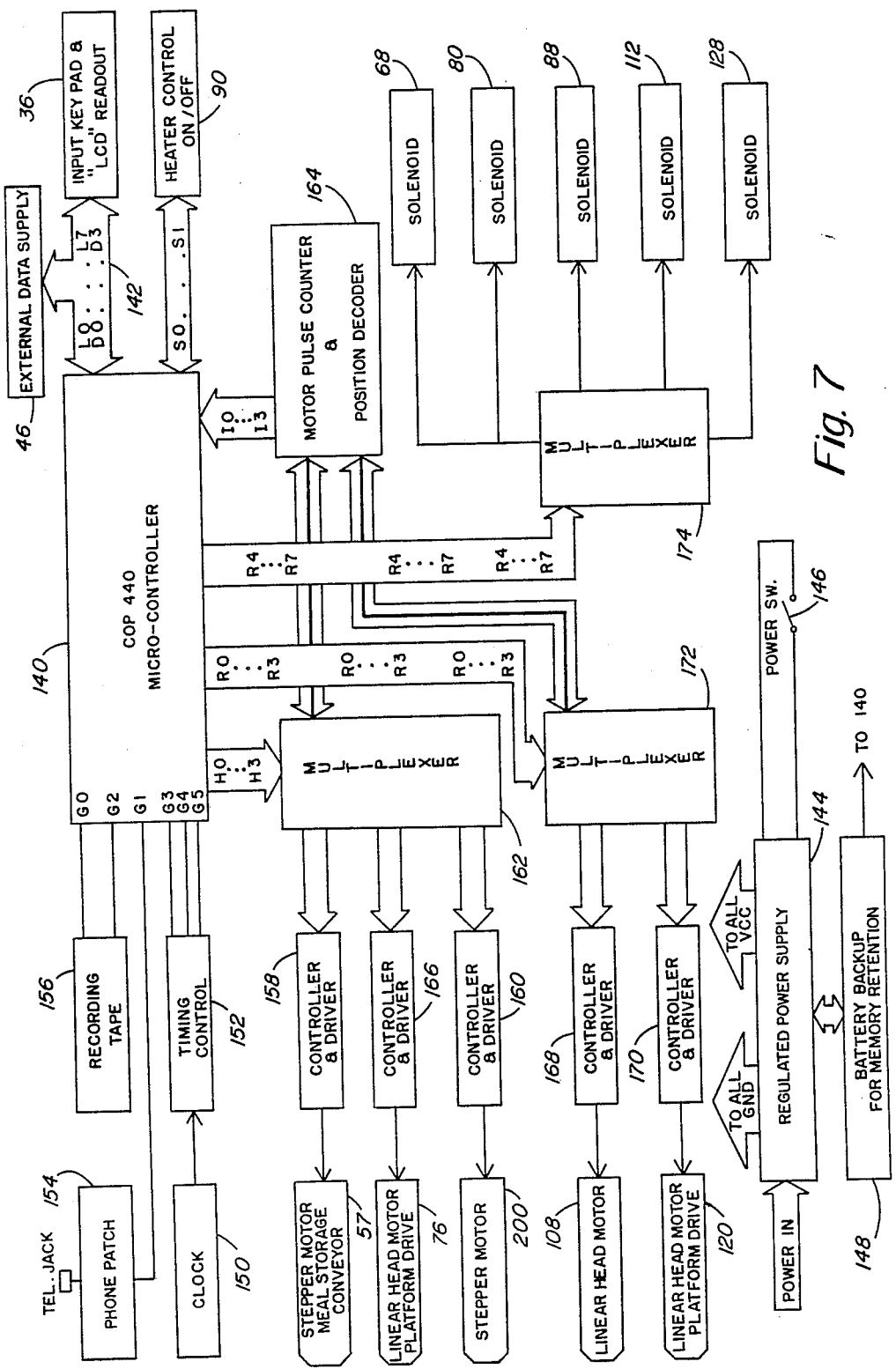
FIG. 7 is a schematic block diagram of control circuitry with input means for enabling food servings stored in the apparatus of FIG. 1 to be dispensed to an animal at times selected through the input means.

FIG. 7 is a schematic block diagram of control circuitry housed in the compartment 62, for controlling operations of the various mechanisms inside the cabinet 12.

A micro-controller 140 such as, e.g., National Semiconductor COP 440 is coupled to the input means 36, and to other peripheral input and output control circuitry as required for proper operation of the present apparatus 10.

An input data bus 142 connecting the input means 36 and the controller 140 to one another, is also connected to the data port 46 so that the input means of one feeding apparatus 10 can serve as a "master" by inputting various operating parameters to the micro-controllers of other like apparatus so connected with one another.

A regulated power supply 144 supplies all required operating voltages when connected to outside power mains and a power switch 146 provided at a convenient location on the cabinet 12 is closed. In the event of a temporary power line failure, a battery backup 148 connected to the micro-controller 140 ensures memory retention.

A master clock 150 establishes an operating speed for the micro-controller 140, and a timing control circuit 152 including dividers and the like supplies required clock signals to the controller 140. A phone patch 154 enables a telephone voice input to be reproduced over the speaker 44 on the cabinet 12, and a tape recorder 156 coupled to the controller 140 can be actuated at selected times entered by the input means 36 to reproduce the animal owner's voice for the comfort of the animal.

The heaters 90 are also coupled to the micro-controller 140 to be energized at the selected feeding times.

The stepper motors for moving the belt 52 that supports the food serving bowl shelves 50, and movement of the food conveyor belt 82, are energized through respective controller and driver circuits 158, 160 coupled to the micro-controller 140 through a multiplexer circuit 162. Motor pulses are counted and belt positions are decoded by a counter and decoder circuit 164 that is also connected to the multiplexer 162 and supplies corresponding inputs to the controller 140. The linear head motors 76, 108 and 120 are also energized via respective controller and driver circuits 166, 168 and 170 through multiplexer 162 and another multiplexer circuit 172. Motor pulse count and position information associated with the motors 76, 108 and 120 is also provided to the controller 140 by the counter and decoder 164 and both multiplexer circuits 162, 172.

The solenoid mechanisms 68, 80, 88, 112 and 128 are energized at determined times by operation of the controller 140 through multiplexer circuit 174.

The controller and driver circuits, multiplexer circuits and pulse counter and position decoder circuit are conventional circuits and may be obtained in the form of integrated circuit devices well-known to those skilled in the art.

For the initial set-up and operation of the apparatus 10, the cabinet 12 is moved on the casters 14 to a desired feeding location, and leveled with the aid of bubble level 34 on the cabinet 12. The water supply container 130 is filled, connected to the water conduit 132 through a water-tight cap, and inverted and mounted in the storage section 16. Individual food servings are prepared and placed in the bowls 48, and the bowls are placed on successive shelves 50 in the storage section 16.

With power applied, the operator loads into the system memory through the keypad 38 of the input means 36, the following information:
1. Is refrigeration required?
2. If yes above, warming cycle time.
3. Delivery time of each meal during the day.
4. Total number of meals.
5. When to playback recorded messages.
6. Optional medication (pills), dog snacks.

The above entires may be prompted by the LC display 40. When a start button on the keypad 38 is pushed, the microcontroller 140 performs the following operations.

The solenoid activated feed-through door 84 is slid open, and the platform 66 operated by linear head motor 76 is elevated to the level of the lower-most shelf 50 in the storage section 16. Solenoid mechanism 68 actuates the swivel arm 64 to push the lower-most bowl 48 onto the platform 66. Platform 66 is then lowered by the motor 76 to the level of the food conveyor belt 82. While in this position and if warming s required, the heaters 90 in the warming section 20 are turned on for the selected time. After completion of the warming cycle, the swivel arm 78 actuated by the solenoid mechanism 80 places the bowl 48 onto the upstream end of the food conveyor belt 82. Belt 82 is then driven by stepper motor 200 (FIG. 4). When stepper motor 200 has received a sufficient number of pulses to move the bowl 48 on the belt 82 to the position below the feed opening 28, the belt 82 is stopped.

Solenoid mechanism 112 connected to sliding panel 110 operates and, simultaneously, the linear head motor 108 is driven to raise and lock the bowl 48, now resting on the belt 86, at the feeding position which is maintained for the length of time that the system programmer desires to leave the food serving exposed to the animal. A pre-recorded message from the animal's owner, or a telephone message, can be reproduced during the feeding times. As mentioned, water is always available to the animal in the open water bowl 134.

When the preset feeding time is finished, the motor 108 is energized an amount sufficient to return the belt 82 and the bowl 48 to a level configuration, and the solenoid mechanism 112 is de-energized to allow the protective food panel 110 to slide back in place. The stepping motor for the belt 82 now receives the number of pulses necessary to place the bowl 48 at the downstream end of the belt 82 where the solenoid mechanism 128 can push the bowl onto the platform 114 via the swivel arm 122. The bowl is lowered by operation of the motor 120 and eJected from the platform 114 by the swivel arm 124 (also operated by solenoid mechanism 128). Ejection of the empty bowl into the storage compartment of the food delivery section 24 ends the first feeding cycle. Micro-controller 140 now supplies stepper motor 57 (FIG. 4) with a number of pulses sufficient to lower the next shelf 50 of the meal storage conveyor to the transfer location 56.

By pre-programmed control, the complete operation cycle can be repeated at each selected feeding interval.

If desired, one or more additional gravity feed dispensers may be added which, under the control of micro-controller 140, will dispense medication in pill form, such as vitamins or minerals, as well as "animal treats".

The apparatus described herein can be used as a stand-alone unit capable of supplying all the food required for a single animal such as a dog while at home, for a period of up to about 3-5 days depending on the number and kind of programmed meals to be dispensed each day. For kennel operation, one unit can become a master control unit which, by being connected to additional units via the data port 46, can control the feeding of additional animals in different pens. For record keeping, an optional printer could be connected to the cluster of stations in order to record the station number, date, time, type of meal and medication.

Various modifications of the present system will be apparent, without departing from the scope of the invention as delineated by the following claims.

We claim:

1. Animal feeding apparatus, comprising:
   a cabinet having a feed opening dimensioned and located so as to allow an animal to reach through the opening and consume food positioned in the cabinet next to the feed opening;
   storage means in said cabinet for storing a number of individually prepared food servings for the animal and for conveying successive ones of the food servings to a transfer location inside said cabinet;
   dispensing means disposed in operative relation to said storage means for retrieving each of said food servings from said transfer location and for conveying each retrieved serving to a position proximate to the feed opening in said cabinet at selected times;
   control means including input means and coupled to said dispensing means, for enabling each of the food servings stored in said storage means to be retrieved and conveyed proximate to said feed opening at selected times entered via said input means; and
   data port means coupled to said control means for enabling items of feeding information entered via said input means to be entered into control means of additional feeding apparatus for controlling feeding of additional animals, when the control means of the additional feeding apparatus are coupled to said data port means.

2. The apparatus of claim 1, including means for refrigerating stored food servings, and means for warming the refrigerated food servings prior to conveying the food servings to the animal, and wherein said control means includes means for controlling operation of said refrigerating means and said warming means in response to corresponding information entered via said input means.

3. Animal feeding apparatus, comprising:
   a cabinet having a feed opening dimensioned and located so as to allow an animal to reach through the opening and consume food positioned in the cabinet next to the feed opening;

storage means in said cabinet for storing a number of individually prepared food servings for the animal and for conveying successive ones of the food servings to a transfer location inside said cabinet;

dispensing means disposed in operative relation to said storage means for retrieving each of said food servings from said transfer location and for conveying each retrieved serving to a position proximate to the feed opening in said cabinet at selected times; and control means including input means and coupled to said dispensing means, for enabling each of the food servings stored in said storage means to be retrieved and conveyed proximate to said feed opening at selected times entered via said input means;

wherein said storage means comprises:

a number of shelves each for supporting an individual food servings, and means associated with said shelves for aligning successive ones of the shelves with the transfer location at which a food serving on each shelf can be retrieved by said dispensing means.

4. The apparatus of claim 3, wherein said aligning means comprises a movable belt.

5. The apparatus of claim 3, including first swivel arm means for transferring a food serving on each shelf when aligned with said transfer location, into operative relation with said dispensing means.

6. The apparatus of claim 3, wherein said dispensing means comprises an endless belt supported for movement over a path that extends below the feed opening in said cabinet.

7. The apparatus of claim 6, wherein said dispensing means includes means for deflecting a stretch portion of said endless belt that extends below said feed opening so that a food serving on the belt can be placed adjacent to said feed opening for a certain time while the belt is stationary.

8. The apparatus of claim 6, wherein said dispensing means includes a first platform for receiving the food servings at said transfer location, and means for moving the first platform between said transfer location and an upstream location of said endless belt.

9. The apparatus of claim 8, wherein said dispensing means includes second swivel arm means mounted in operative relation with said first platform, for transferring a food serving on the first platform onto said endless belt when the platform is at said upstream location.

10. The apparatus of claim 8, including bowl storage means in said cabinet for storing bowls initially placed in said storage means with corresponding food servings, after the animal feeds from the bowls and said endless belt moves the bowls downstream of said feed opening.

11. The apparatus of claim 3, including means for refrigerating stored food servings, and means for warming the refrigerated food servings prior to conveying the food servings to the animal, and wherein said control means includes means for controlling operation of said refrigerating means and said warming means in response to corresponding information entered via said input means.

12. A method of feeding an animal at selected times with individual food servings, comprising:

preparing a number of food servings for feeding to an animal each at a different feeding time over a given time period;

storing the food servings in an enclosure by placing the food servings on corresponding shelves in the enclosure, thereby keeping the stored servings inaccessible to the animal;

selecting the feeding times at which the stored food servings are to be fed to the animal;

aligning successive ones of the shelves with a transfer location inside the enclosure; and dispensing each of the stored food servings to the animal by retrieving each serving from its associated shelf at said transfer location, and conveying the retrieved food serving to the vicinity of a feed opening in the enclosure at the selected feeding times;

whereby the animal can reach through the feed opening to consume the food servings at the selected feeding times.

13. The method of claim 12, including covering the feed opening at times other than the selected feeding times.

14. The method of claim 12, including refrigerating the stored food servings.

15. The method of claim 14, including warming the food servings prior to dispensing the food servings to the animal.

16. The method of claim 12, including arranging the prepared food servings in corresponding bowls, storing the bowls in said enclosure and dispensing the bowls with the food servings to the animal.

17. The method of claim 16, including storing bowls that have been dispensed to the animal with the food servings at the selected feeding times, in an empty bowl storage compartment of the enclosure after the animal feeds from the bowls.

18. Animal feeding apparatus, comprising:

a cabinet including a storage section, a warming section, and a food delivery section having a feed opening sized and located to allow an animal to reach through the opening and consume food presented from within the food delivery section of the cabinet next to the feed opening;

meal storage conveyor means in the storage section of said cabinet and including a first endless belt and a number of shelves depending from the belt for supporting individual food servings for the animal, and for aligning successive ones of the shelves with a transfer location at a lower region of said storage section;

retrieving means in the warming section of the cabinet for retrieving a food serving from a shelf of the meal storage conveyor means when the shelf is aligned with said transfer location, and for lowering the food serving to a warming position below the storage section;

food delivery means in the food delivery section of the cabinet and including a second endless belt for conveying a food serving from said warming position to a position proximate to said feed opening at selected feeding times; and control means including input means and coupled to said meal storage conveyor means, said retrieving means and said food delivery means, for causing each of the food servings stored on said shelves to be retrieved at said transfer location and conveyed by the second endless belt proximate to said feed opening after the selected feeding times are entered by said input means.

19. The apparatus of claim 18, wherein said retrieving means comprises a platform and a shaft supporting the platform for vertical movement between said transfer location and said warming position, and a first swivel arm member for transferrring a food serving on each successive shelf onto the platform when the shelf and the platform are aligned with said transfer position.

20. The apparatus of claim 19, wherein said food delivery means includes a second swivel arm member for transferring a food serving on said platform when at said warming position, onto an upstream end of said second endless belt.

21. The apparatus of claim 18, wherein said food delivery means includes means for deflecting a stretch of said second endless belt that extends below said feed opening so that a food serving on the belt can be placed adjacent to said feed opening for a certain time while the belt is stationary.

22. The apparatus of claim 21, wherein said deflecting means includes a generally I-shaped member arranged for vertical movement between upper and lower stretches of said second endless belt.

23. The apparatus of claim 18, including means for refrigerating stored food servings, and means for warming the refrigerated food servings prior to conveying the food servings to the animal, and wherein said control means includes means for controlling operation of said refrigerating means and said warming means in response to corresponding information entered via said input means.

* * * * *